United States Patent
Rao et al.

(10) Patent No.: US 9,697,821 B2
(45) Date of Patent: Jul. 4, 2017

(54) METHOD AND SYSTEM FOR BUILDING A TOPIC SPECIFIC LANGUAGE MODEL FOR USE IN AUTOMATIC SPEECH RECOGNITION

(71) Applicant: Tencent Technology (Shenzhen) Company Limited, Shenzhen (CN)

(72) Inventors: Feng Rao, Shenzhen (CN); Li Lu, Shenzhen (CN); Bo Chen, Shenzhen (CN); Shuai Yue, Shenzhen (CN); Xiang Zhang, Shenzhen (CN); Eryu Wang, Shenzhen (CN); Dadong Xie, Shenzhen (CN); Lou Li, Shenzhen (CN); Duling Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 583 days.

(21) Appl. No.: 14/108,223

(22) Filed: Dec. 16, 2013

(65) Prior Publication Data

US 2014/0214419 A1   Jul. 31, 2014

Related U.S. Application Data

(63) Continuation of application No. PCT/CN2013/086707, filed on Nov. 7, 2013.

(30) Foreign Application Priority Data

Jan. 29, 2013 (CN) .......................... 2013 1 0033201

(51) Int. Cl.
*G10L 15/06* (2013.01)
*G10L 15/183* (2013.01)
(Continued)

(52) U.S. Cl.
CPC .......... *G10L 15/063* (2013.01); *G10L 15/183* (2013.01); *G10L 15/197* (2013.01); *G10L 15/26* (2013.01)

(58) Field of Classification Search
CPC ....... G10L 15/08; G10L 15/18; G10L 15/183; G10L 15/197; G10L 2015/0633
(Continued)

(56) References Cited

U.S. PATENT DOCUMENTS

| 6,507,829 B1 * | 1/2003 | Richards | G06F 17/2715 704/9 |
| 7,865,357 B2 * | 1/2011 | Acero | G10L 15/193 704/1 |

(Continued)

FOREIGN PATENT DOCUMENTS

| CN | 1941079 A | 4/2007 |
| CN | 101329868 A | 12/2008 |

(Continued)

OTHER PUBLICATIONS

Kawahara, et al. "Dialogue speech recognition by combining hierarchical topic classification and language model switching." IEICE transactions on information and systems 88.3, Mar. 2005, pp. 446-454.*

(Continued)

*Primary Examiner* — James Wozniak
(74) *Attorney, Agent, or Firm* — Morgan, Lewis & Bockius LLP

(57) ABSTRACT

An automatic speech recognition method includes at a computer having one or more processors and memory for storing one or more programs to be executed by the processors, obtaining a plurality of speech corpus categories through classifying and calculating raw speech corpus; obtaining a plurality of classified language models that (Continued)

respectively correspond to the plurality of speech corpus categories through a language model training applied on each speech corpus category; obtaining an interpolation language model through implementing a weighted interpolation on each classified language model and merging the interpolated plurality of classified language models; constructing a decoding resource in accordance with an acoustic model and the interpolation language model; and decoding input speech using the decoding resource, and outputting a character string with a highest probability as a recognition result of the input speech.

8 Claims, 12 Drawing Sheets

(51) Int. Cl.
*G10L 15/197* (2013.01)
*G10L 15/26* (2006.01)

(58) Field of Classification Search
USPC .......................... 704/243, 251, 257
See application file for complete search history.

(56) References Cited

U.S. PATENT DOCUMENTS

| | | | |
|---|---|---|---|
| 2002/0133340 A1* | 9/2002 | Basson | G10L 15/22 704/235 |
| 2004/0088162 A1* | 5/2004 | He | G10L 15/063 704/235 |
| 2004/0267518 A1* | 12/2004 | Kashima | G10L 15/06 704/9 |
| 2005/0055210 A1* | 3/2005 | Venkataraman | G10L 15/183 704/255 |
| 2005/0228641 A1* | 10/2005 | Chelba | G06F 17/27 704/9 |
| 2006/0041427 A1* | 2/2006 | Yegnanarayanan | G10L 15/063 704/235 |
| 2006/0074656 A1 | 4/2006 | Mathias et al. | |
| 2007/0100618 A1* | 5/2007 | Lee | G10L 15/1822 704/238 |
| 2007/0219798 A1* | 9/2007 | Wang | G10L 15/063 704/257 |
| 2007/0233488 A1* | 10/2007 | Carus | G10L 15/183 704/257 |
| 2008/0208840 A1* | 8/2008 | Zhang | G06F 17/278 |
| 2009/0055184 A1* | 2/2009 | Hebert | G06F 17/2705 704/257 |
| 2009/0083023 A1* | 3/2009 | Foster | G06F 17/2827 704/3 |
| 2010/0076760 A1* | 3/2010 | Kraenzel | 704/235 |
| 2010/0076761 A1* | 3/2010 | Juergen | G10L 15/197 704/235 |
| 2010/0324901 A1* | 12/2010 | Carter | G10L 15/197 704/255 |
| 2011/0029301 A1* | 2/2011 | Han | G06F 3/04845 704/9 |
| 2011/0153324 A1* | 6/2011 | Ballinger | G10L 15/30 704/235 |
| 2011/0302172 A1* | 12/2011 | Chandrasekar | G06F 17/3064 707/748 |
| 2012/0197905 A1* | 8/2012 | Kumar | G06F 17/2785 707/748 |
| 2012/0203539 A1* | 8/2012 | Axelrod | G06F 17/2809 704/2 |
| 2012/0278060 A1* | 11/2012 | Cancedda | G06F 17/2818 704/2 |
| 2012/0316877 A1* | 12/2012 | Zweig | G10L 15/197 704/251 |
| 2013/0216029 A1* | 8/2013 | Pawlewski | H04M 3/2281 379/88.01 |
| 2014/0214419 A1 | 7/2014 | Rao et al. | |

FOREIGN PATENT DOCUMENTS

| | | |
|---|---|---|
| CN | 102439542 A | 5/2012 |
| CN | 102800314 A | 11/2012 |
| JP | 2011154099 A | 8/2011 |
| KR | 20130068624 A | 6/2013 |
| WO | WO 2014117555 A1 | 8/2014 |

OTHER PUBLICATIONS

Kilgour, Kevin. "Language Model Adaptation using Interlinked Semantic Data.," May 2009, pp. 1-62.*
Le, Hai-Son, et al. "Structured output layer neural network language model." Acoustics, Speech and Signal Processing (ICASSP), 2011 IEEE International Conference on. IEEE, Jan. 2011, pp. 5524-5527.*
Naptali, Welly, et al. "Topic-Dependent-Class-Based-Gram Language Model." Audio, Speech, and Language Processing, IEEE Transactions on 20.5, Jul. 2012, pp. 1513-1525.*
Naptali, Welly, Masatoshi Tsuchiya, and Seiichi Nakagawa. "Topic-dependent language model with voting on noun history." ACM Transactions on Asian Language Information Processing (TALIP) 9.2, Jun. 2010, pp. 1-31.*
Naptali, Welly. Study on n-gram language models for topic and out-of-vocabulary words. Diss. PhD thesis, Toyohashi University of Technology, Jan. 2011, pp. 1-137.*
Seymore, Kristie, and Roni Rosenfield. "Large-scale topic detection and language model adaptation," Jun. 1997, pp. 1-16.*
Wandmacher, et al. "Methods to integrate a language model with semantic information for a word prediction component." arXiv preprint arXiv:0801.4716, Jan. 2008, pp. 1-9.*
Tencent Technology, Written Opinion, PCT/CN2013/086707, Feb. 7, 2014, 6 pgs.
Tencent Technology, IPRP, PCT/CN2013/086707, Aug. 4, 2015, 7 pgs.
Tencent Technology, ISR, PCT/CN2013/086707, Feb. 13, 2014, 5 pgs.

* cited by examiner

METHOD AND SYSTEM FOR BUILDING A TOPIC SPECIFIC LANGUAGE MODEL FOR USE IN AUTOMATIC SPEECH RECOGNITION

RELATED APPLICATIONS

This application is a continuation application of PCT Patent Application No. PCT/CN2013/086707, entitled "METHOD AND SYSTEM FOR AUTOMATIC SPEECH RECOGNITION" filed on Nov. 7, 2013, which claims priority to Chinese Patent Application No. 201310033201.7, "METHOD AND SYSTEM FOR AUTOMATIC SPEECH RECOGNITION," filed on Jan. 29, 2013, both of which are hereby incorporated by reference in their entirety.

FIELD OF THE INVENTION

The present invention relates to the technical field of Automatic Speech Recognition (ASR), especially relates to a method and system for automatic speech recognition.

BACKGROUND OF THE INVENTION

Automatic speech Recognition technology is a sort of technology which transforms the lexical content of human speech into input characters that can be read by computers. The speech recognition has a complicated processing flow, mainly including four processes of acoustic model training, language model training, decoding resource constructing and decoding. FIG. 1 is a schematic diagram of the main processing flow in the conventional automatic speech recognition system. Refer to FIG. 1, the main processing flow includes:

Step 101 and 102, it requires to conduct the acoustic model training according to the acoustic material so as to obtain the acoustic model, similarly conducting the language model training according to the raw corpus so as to obtain the language model.

The mentioned acoustic model is one of the most important sections of speech recognition system, most of the mainstream speech recognition systems adopt HMM (Hidden Markov Model) to construct models, HMM is a statistical model which is used to describe the Markov process containing a hidden and unknown parameter. In HMM, the state is not directly visible, but some variants affected by the state are visible. The corresponding probability between speech and phone is described in the acoustic model. The mentioned phone is the minimum phonetic unit divided according to the natural property of speech. From the aspect of acoustic property, the phone is the minimum phonetic unit divided from the aspect of sound quality; from the aspect of physiological property, an articulation action forms a phone.

The main structure of the mentioned language model is the probability distribution p(s) of character string s, reflecting the probability of character string s appearing as a sentence. Suppose that w stands for every word in the character string s, so:

$$p(s)=p(w_1w_2w_3 \ldots w_n)=p(w_1)p(w_2|w_1)p(w_3|w_1w_2) \ldots p(wk|w_1w_2 \ldots w_{k-1})$$

Step 103, according to the mentioned acoustic model, language model and preset dictionary, the decoding resource is built accordingly. The mentioned decoding resource is Weighted Finite State Transducer (WFST) network.

Step 104, put the speech into the decoder, the mentioned speech will be decoded by the decoder according to the decoding resource that has been built, and output the character string with the highest probability value as the recognition result of the mentioned input speech.

However, most of the conventional speech recognition technology is based on the universal speech recognition application that constructs the model for the common speech recognition, in this situation, the training corpus of language model is based on the data collection and actual input of users, though it reflects well the speech habits of the users to some extent and often has a better recognition effect for the daily expression, because of less frequent obscure words in the training corpus of the language model, such as medicine name, place name, etc., it can't form an effective probability statistics model, the probability value of the character string corresponding to the obscure words in the language model is very low, so when it needs to recognize the obscure words spoken by the user, a problem of data offset often happens, it means the recognized character string is not the words spoken by the user, in other words, the recognition accuracy for the speech of the obscure words is lower, thus it is difficult to achieve a better recognition result.

SUMMARY

In accordance with some embodiments, an automatic speech recognition method comprises at a computer having one or more processors and memory for storing one or more programs to be executed by the processors: obtaining a plurality of speech corpus categories through classifying and calculating raw speech corpus; obtaining a plurality of classified language models that respectively correspond to the plurality of speech corpus categories through a language model training applied on each speech corpus category; obtaining an interpolation language model through implementing a weighted interpolation on each classified language model and merging the interpolated plurality of classified language models; constructing a decoding resource in accordance with an acoustic model and the interpolation language model; and decoding input speech using the decoding resource, and outputting a character string with a highest probability as a recognition result of the input speech.

In accordance with some embodiments, obtaining a plurality of speech corpus categories through classifying and calculating raw speech corpus further comprises: calculating an affiliation matrix between terms based on the raw corpus; extracting term characteristics from the raw corpus using a term frequency—inverse document frequency (TF-IDF) method; implementing a dimension reduction method on the extracted term characteristics based on the affiliation matrix; inputting the term characteristics after the dimension reduction into a classifier for training, and outputting the plurality of speech corpus categories.

In accordance with some embodiments, calculating an affiliation matrix between terms based on the raw corpus further comprises: calculating co-occurrence rates between each term and any other term using equation $$CO_{ij} = \frac{f_{ij} \times f_{ij}}{d_{ij} \times d_{ij} \times f_i \times f_j},$$

and constructing a co-occurrence matrix based on the co-occurrence rates, wherein $f_{ij}$ is a number of times that term i occurs prior to term j, $d_{ij}$ is an average distance between term i and term j, $f_i$ is a term frequency of term i, and $f_j$ is a term frequency of term j; calculating affiliation rates between each term and any other term using equation, $A_{ij}=\text{sqrt}(\Sigma OR(CO_{ik},CO_{jk})\Sigma OR\Sigma OR (CO_{ki},CO_{kj}))$, based on the co-occurrence matrix; and constructing the affiliation matrix based on the affiliation rates.

In accordance with some embodiments, the dimension reduction method is a principal components analysis (PCA) dimension reduction method.

In accordance with some embodiments, the classifier is a support vector machine (SVM) classifier.

In accordance with some embodiments, the weighted interpolation process is implemented on each classified language model based on an obscure degree of the respective speech corpus category, wherein the obscure degree of the speech corpus category is in a positive correlation with a weighted value.

In accordance with some embodiments, an automatic speech recognition method comprises at a computer having one or more processors and memory for storing one or more programs to be executed by the processors: obtaining a primary language model through a language model training applied on raw speech corpus; obtaining a plurality of speech corpus categories through classifying and calculating the raw speech corpus; obtaining a plurality of classified language models that respectively correspond to the plurality of speech corpus categories through a language model training applied on each speech corpus category; constructing a primary decoding resource in accordance with an acoustic model and the primary language model; constructing a plurality of classified decoding resources in accordance with the plurality of classified language models, respectively; and decoding input speech using the primary decoding resource, and outputting n character strings with highest n probability values; and decoding the n character strings using each of the plurality of classified decoding resources, and outputting a character string with a highest composite probability as a recognition result of the input speech.

In accordance with some embodiments, decoding the n character strings using each of the plurality of classified decoding resources, and outputting a character string with a highest composite probability as a recognition result of the input speech further comprises: obtaining a probability value l(w) for each character string decoded using the primary decoding resource; obtaining a probability value n(w) for each character string decoded using each classified decoding resource; and multiplying the probability value n(w) by the probability value l(w) to obtain a composite probability value p(w) for each character string.

In accordance with some embodiments, an automatic speech recognition system comprises one or more processors; memory for storing one or more programs to be executed by the processors; a classifying process module configured to obtain a plurality of speech corpus categories through classifying and calculating raw speech corpus; a classifying language model training module configure to obtain a plurality of classified language models that respectively correspond to the plurality of speech corpus categories through a language model training applied on each speech corpus category; a weight merging module configured to obtain an interpolation language model through implementing a weighted interpolation on each classified language model and merge the interpolated plurality of classified language models; a resource construction module configured to construct decoding resource in accordance with an acoustic model and the interpolation language model; and a decoder configured to decode input speech using the decoding resource, and outputting a character string with a highest probability as a recognition result of the input speech.

In accordance with some embodiments, an automatic speech recognition system comprises: one or more processors; memory for storing one or more programs to be executed by the processors; a primary language model training module configured to obtain a primary language model through a language model training applied on raw speech corpus; a classifying process module configured to obtain a plurality of speech corpus categories through classifying and calculating the raw speech corpus; a classifying language model training module configured to obtain a plurality of classified language models that correspond to the respective plurality of speech corpus categories through a language model training applied on each speech corpus category; a primary resource construction module configured to construct a primary decoding resource in accordance with an acoustic model and the primary language model; a classifying resource construction module configured to construct a plurality of classified decoding resources in accordance with the plurality of classified language models, respectively; and a primary decoder configured to decode input speech using the primary decoding resource, and outputting n character strings with highest n probability values; and a classified decoder configured to decode the n character strings using each of the plurality of classified decoding resources, and outputting a character string with a highest composite probability as a recognition result of the input speech.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following will make further detailed explanation to the present invention combining with attached drawings and specific embodiment.

Figure 1:
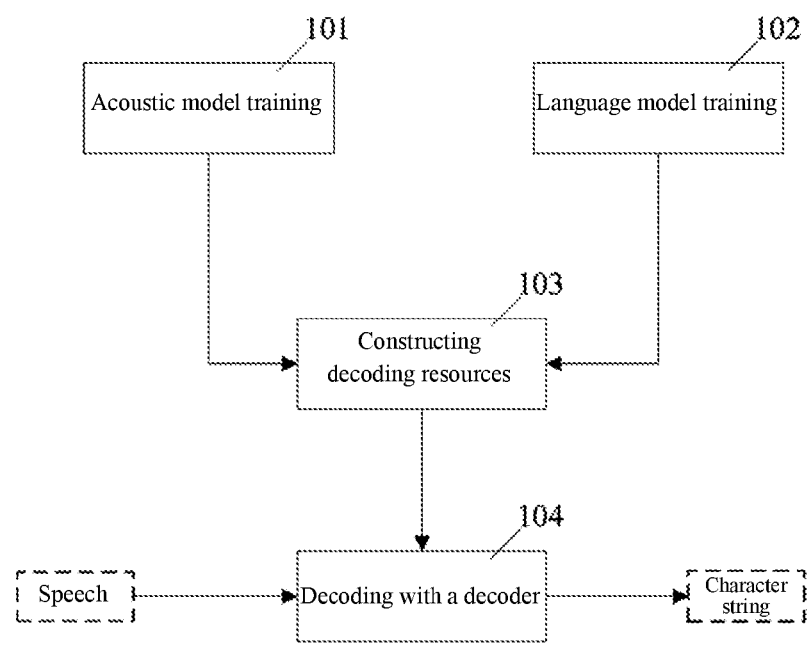
FIG. 1 is a schematic diagram of the main processing flow in the conventional automatic speech recognition system.
Figure 2:
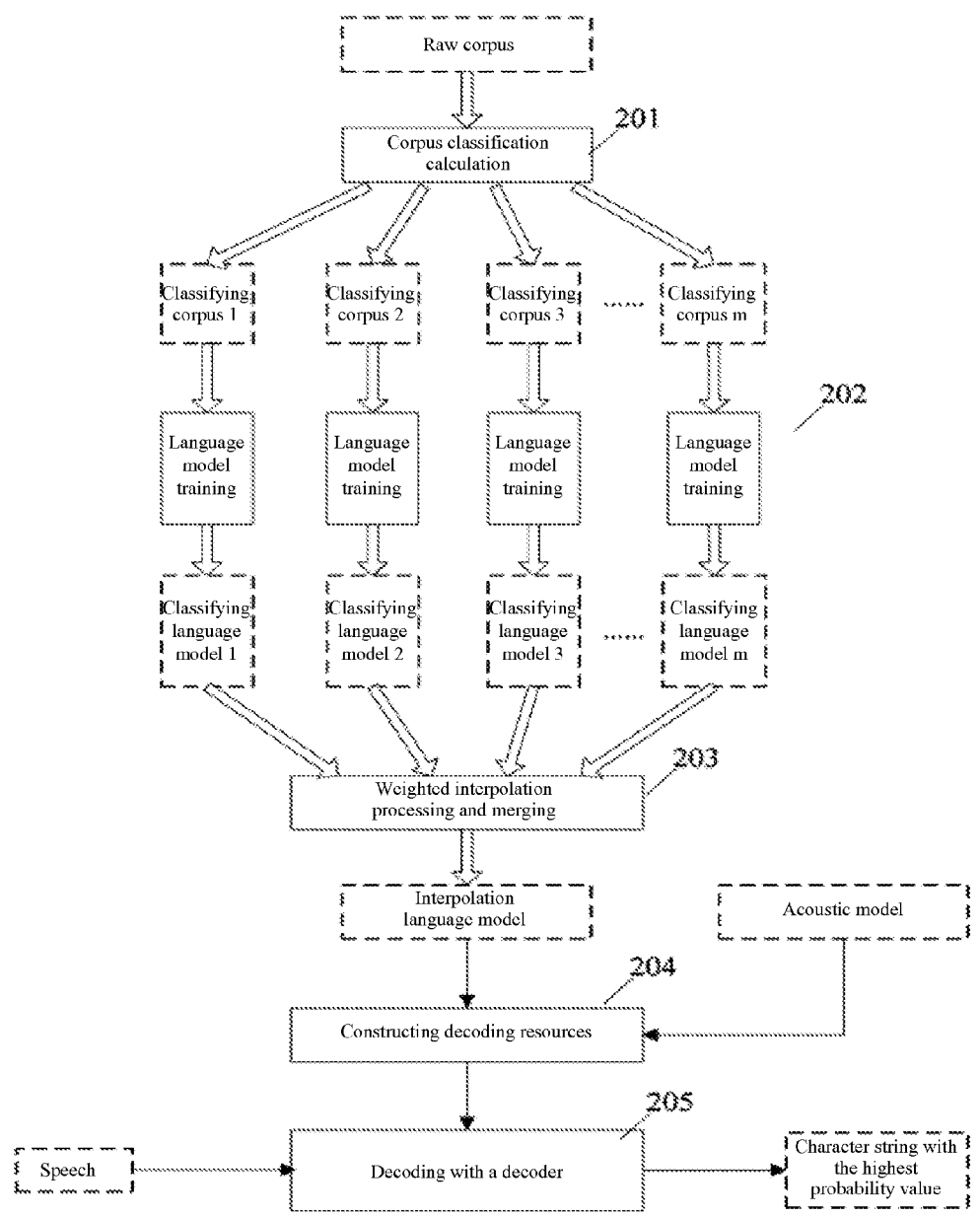
FIG. 2 is a processing flowchart diagram of automatic speech recognition method mentioned in the present invention.

FIG. 2 is a processing flowchart diagram of automatic speech recognition method mentioned in the present invention. Refer to FIG. 2, this flow includes:

Step 201, carry out the corpus classification calculation for the raw corpus so as to obtain different categories of more than one classifying corpus. For example, the mentioned classifying corpus can be divided into many types, such as person name, place name, computer term, medical terminology, etc. For example, "isatis root" belongs to the classification of medical terminology. A term may belong to multi-classification.

Step 202, carry out a language model training calculation for every mentioned classifying corpus to obtain more than one corresponding classifying language models.

Step 203, on the basis of obscure degree of the classification, carry out the processing of weighted interpolation for each of mentioned classifying language model, among which, the obscure degree of the classification and the weighted value corresponding to this classification has a positive correlation relationship, in other words, the higher the obscure degree, the higher the corresponding weighted value, and the classifying language model after the processing of weighted interpolation is merged to obtain the interpolation language model. Thus in the interpolation language model, the probability value of character string corresponding to the obscure words will increase correspondingly, and thus reduce the difference with the probability value of character string corresponding to the commonly used words and improve the speech recognition probability of the obscure words.

Step 204, construct decoding resource according to the acoustic model and the mentioned interpolation language model. Here, it is assumed that the acoustic model has been trained well, and the present invention can directly use the current acoustic model. In addition, the technicians in this field understand that in the process of constructing the decoding resource, it also needs the participation of the dictionary to construct the decoding resource.

Step 205, according to the mentioned decoding resource, decode the input speech, and output the character string with the highest probability value as the recognition result of the mentioned input speech.

Figure 3:
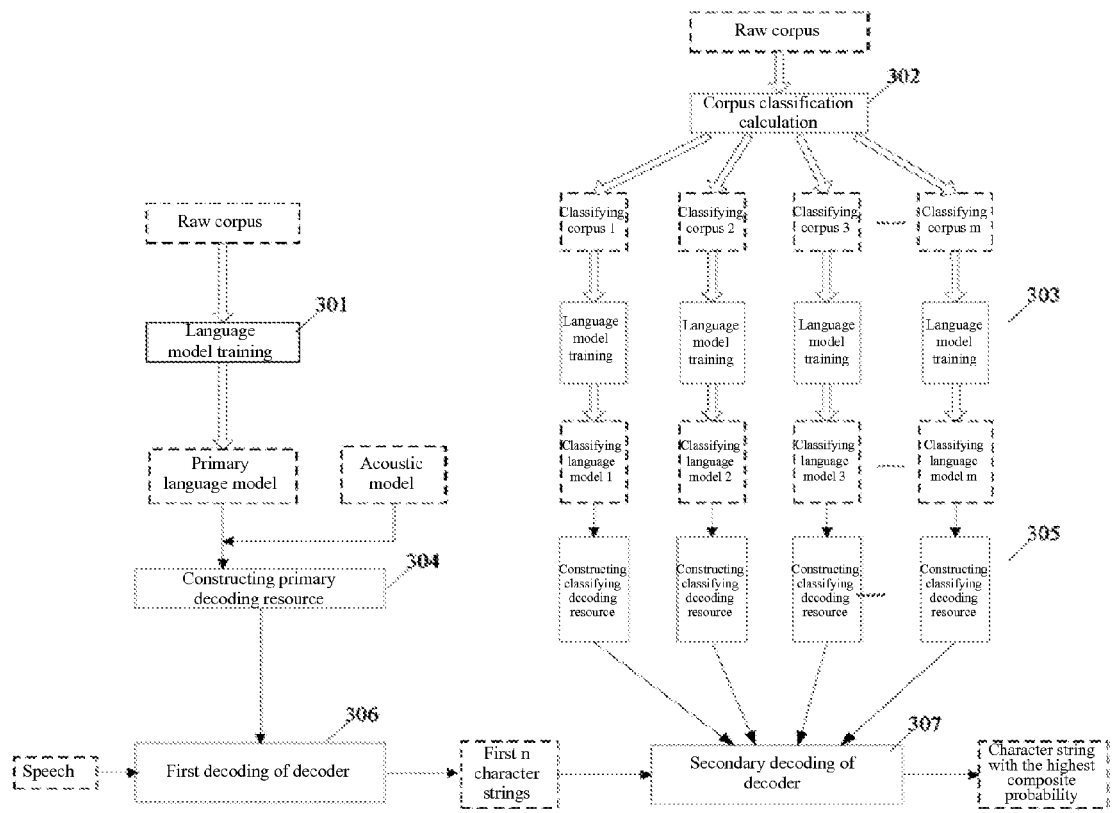
FIG. 3 is another processing flowchart diagram of automatic speech recognition method mentioned in the present invention.

FIG. 3 is another processing flowchart diagram of automatic speech recognition method mentioned in the present invention. Refer to FIG. 3, this flow includes:

Step 301, carry out a calculation of the language model training according to the raw corpus to obtain the primary language model. Here, the language model training is the conventional regular language model training.

Step 302, carry out the corpus classification calculation for the raw corpus so as to obtain different categories of more than one classifying corpus.

Step 303, carry out a language model training calculation for the every mentioned classifying corpus to obtain more than one corresponding classifying language models.

Step 304-Step 305, construct the primary decoding resource according to the acoustic model and the mentioned primary language model, and construct the corresponding classifying decoding resource according to each of the mentioned classifying language model. The mentioned primary decoding resource is used during the first decoding, and the mentioned classifying decoding resource is used during the second decoding.

Step 306, decode the input speech according to the mentioned primary decoding resource, which is the first decoding, output n character strings of which probability value l(w) ranks the top n. The mentioned probability value l(w) is the probability value of character strings corresponding to the speech in the primary language model.

Step 307, according to the various decoding resource corresponding to the mentioned various classifying language models in sequence, respectively decode the mentioned n character strings to obtain the probability value n(w) of every character string in every classifying language model. Here, it is assumed that there are m classifying language models, nxm probability value n(w) will be obtained. Then, multiply the probability value n (w) of each character string in each classifying language model by the probability value l(w) of such character string in the primary language model to get nxm composite probability p (w), output the character string with the highest composite probability p(w) as the recognition result of the mentioned input speech.

Figure 4:
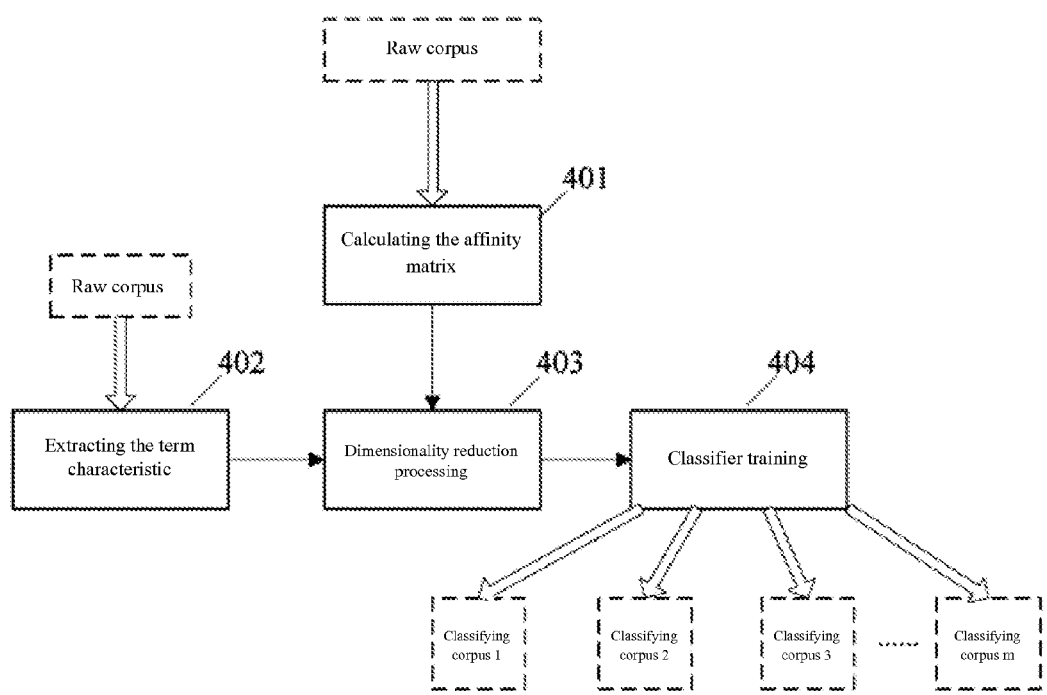
FIG. 4 is a specific processing flowchart diagram of a different categories of more than one classifying corpus obtained from the corpus classification calculation for the raw corpus mentioned in the present invention.

In the mentioned Step 201 and Step 302, the mentioned specific way that carries out the corpus classification calculation for the raw corpus to obtain different categories of more than one classifying corpus is as shown in FIG. 4, specifically including:

Step 401, calculate the affinity matrix between terms according to the raw corpus.

The mentioned raw corpus is a training text. The present invention describes the semantic relation between terms by building the affinity matrix of terms (also known as term co-occurrence matrix). In the cognitive level of people, a term is always related to other terms but not exist in isolation. This relation can be expressed by an activating effect, for example, hearing the word of "Doctor", people will associate to "Patient" or "Nurse"; hearing the word of "Cat", people will associate to "Dog"; Hearing "Boy", people will associate to "Girl"; "Drink" is associated with "Water".

So, in this Step 401, firstly calculate the term co-occurrence between every term and another term. The concrete contents include as follows:

Analyze the raw corpus, according to the formula $$CO_{ij} = \frac{f_{ij} * f_{ij}}{d_{ij} * d_{ij} * fi * fj}$$

to calculate the term co-occurrence between every term and another term, and construct the term co-occurrence matrix between terms; among which, the mentioned $f_{ij}$ is the number of times that term i appears in front of term j, $d_{ij}$ is the average distance between term i and term j, fi is the term frequency of term i, fj is the term frequency of term j.

According to the mentioned term co-occurrence matrix and the formula $A_{ij}$=sqrt($\Sigma$OR($CO_{ik}$, $CO_{jk}$)$\Sigma$OR$\Sigma$OR($CO_{ki}$, $CO_{kj}$)), calculate the affinity between terms, and construct the affinity matrix between terms.

The mentioned affinity is defined as the geometrical mean of overlap section between inlink and inlink as well as outlink and outlink of the two terms. Obviously, the term affinity matrix is a symmetric matrix, which is the undirected network. In order of proximity, the terms in the front are basically synonyms, para-synonyms or highly related terms. In the affinity network, the stronger the affinity of edge between two crunodes, the more relevant; if the affinity is very weak and even no edges between two crunodes, it indicates they are almost irrelevant. By calculating Aij, it can construct a covariance matrix between terms, this covariance matrix is the affinity matrix, in this affinity matrix, due to that is sorted by affinity, the part of very small affinity can be omitted, so compared with the dimensionality of term characteristic vector of the original raw corpus, the dimensionality of this affinity matrix is much smaller.

Step 402, extract the term characteristic from the raw corpus by using the method of term frequency—inverse document frequency (TF-IDF).

The main model applied in the text classification of the present invention is Vector Space Model (VSM) of the text. The basic idea of VSM is to express text with the text's characteristic vector <W1, W2, W3, . . . , Wn>, among which Wi is the weight of the ith characteristic item. So, the key step of classification based on VSM is how to extract the effective characteristic reflecting the classification from the text. In this Step 402, the present invention adopts TF-IDF method to extract the term characteristic from the raw corpus, expressing the weight of w with TF-IDF characteristic.

In a given file, the term frequency (TF) refers to the number of times that a given term appears in this file. This number will often be normalized to avoid its erroneous tendency to a long file. The same term may have a higher frequency in the long file than in the short file, regardless of this term is important or not. Inverse document frequency (IDF) is the scale of generalizable importance of a term. IDF of a specific term can be calculated by dividing the total number of files by the number of files containing this term and taking the logarithm of the resulted quotient. The high term frequency in a specific file as well as low file frequency of this term in the overall file set can produce a TF-IDF with high weight. So, TF-IDF tends to keep the special terms in the file, filtering the high frequency terms. So with this TF-IDF method, it can extract the term characteristic of the relatively obscure words from the raw corpus.

Step 403, according to the mentioned affinity matrix, use the dimensionality reduction method to process dimension reduction for the extracted term characteristic.

In this Step 403, the mentioned dimensionality reduction method can be various. However, in a preferred embodiment, it can adopt Principal Components Analysis (PCA) dimensionality reduction method to implement. Due to a higher dimensionality of the term characteristic vector extracted in the Step 402, for example, here, it is assumed to be N dimensionality, but a lower dimensionality of affinity matrix mentioned in the Step 401, for example, here, it is assumed to be M dimensionality, N is far greater than M. Then after the processing of dimensionality reduction, the dimensionality of term characteristic vector of mentioned N dimensionality is reduced to be M dimensionality. In other words, through the processing of dimensionality reduction, it can reduce the influence of noise data, reduce the time complexity and space complexity, etc., those combination of terms with small affinity can be filtered.

Step 404, put the term characteristic after the processing of dimensionality reduction into the classifier for training, output a different categories of more than one classifying corpus.

The classifier is a kind of computer program, which can automatically classify the input data to the known classification. In this Step 404, the mentioned classifier may adopt the current certain classifier. For example, in a preferred embodiment, the mentioned classifier is a Support Vector Machine (SVM) classifier. After the test, the classification results of the present invention in 20 classifications can reach 92% accuracy rate.

Beyond all questions, in addition to the method that carry out the corpus classification calculation for the raw corpus mentioned in FIG. 4, the present invention can also adopt other current corpus classification calculation methods to classify the raw corpus. However, the method mentioned in FIG. 4 has a higher accuracy rate and faster speed.

Corresponding to the aforementioned method, the present invention has also published the speech recognition system to implement the aforementioned method.

Figure 5:
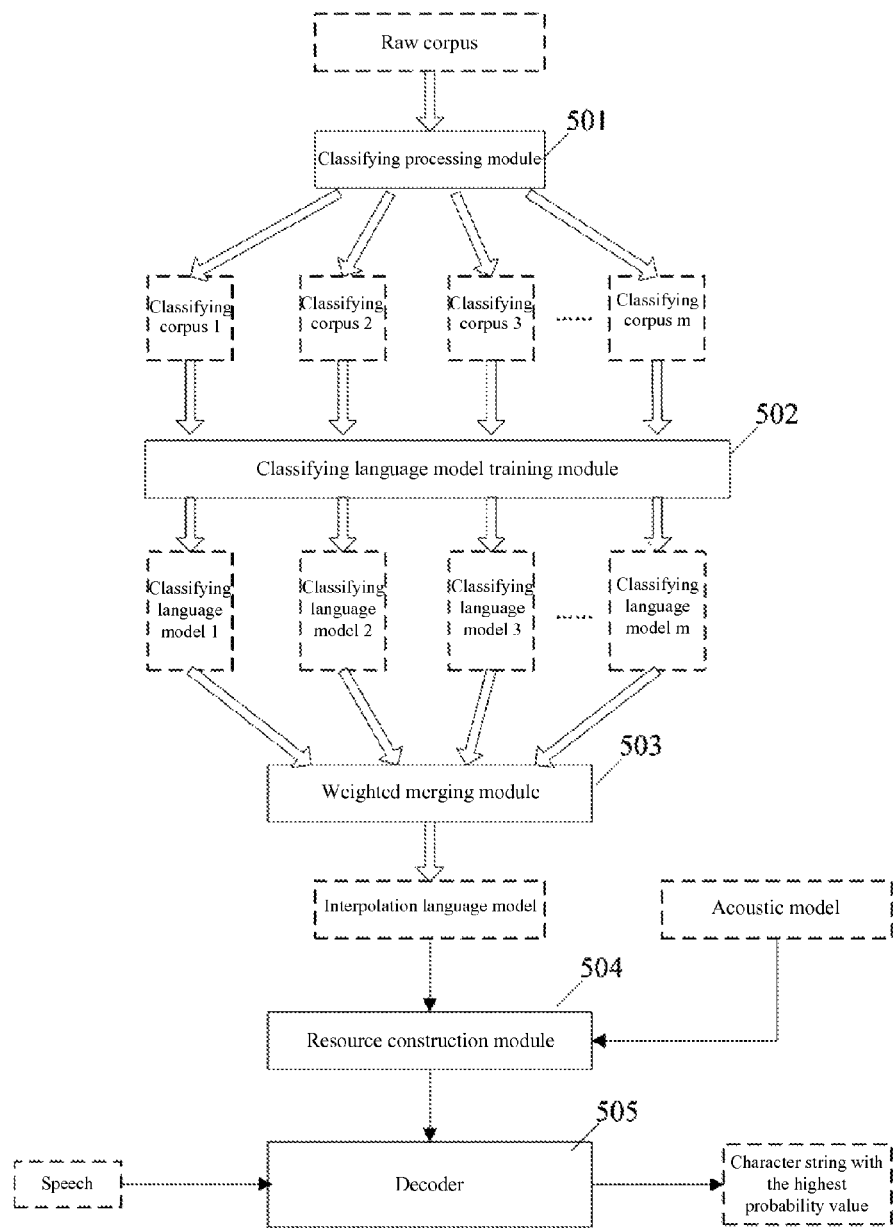
FIG. 5 is a composition schematic diagram of a speech recognition system mentioned in the present invention.

The FIG. 5 is a composition schematic diagram of a certain speech recognition system mentioned in the present invention. Refer to FIG. 5, the system includes:

Classifying processing module 501, configured to carry out the corpus classification calculation for the raw corpus so as to obtain a different categories of more than one classifying corpus.

Classifying language model training module 502, configured to carry out a language model training calculation for the every mentioned classifying corpus to obtain more than one corresponding classifying language models;

Weight merging module 503, configured that on the basis of obscure degree of the classification, carry out the processing of weighted interpolation for each of mentioned classifying language model, among which, the obscure degree of the classification and the weighted value corresponding to this classification has a positive correlation relationship, in other words, the higher the obscure degree, the higher the corresponding weighted value, and the classifying language model after the processing of weighted interpolation is merged to obtain the interpolation language model.

Resource construction module 504, configured to construct decoding resource according to the acoustic model and the mentioned interpolation language model.

Decoder 505, configured that according to the mentioned decoding resource, decode the input speech, and output the character string with the highest probability value as the recognition result of the mentioned input speech.

Figure 6:
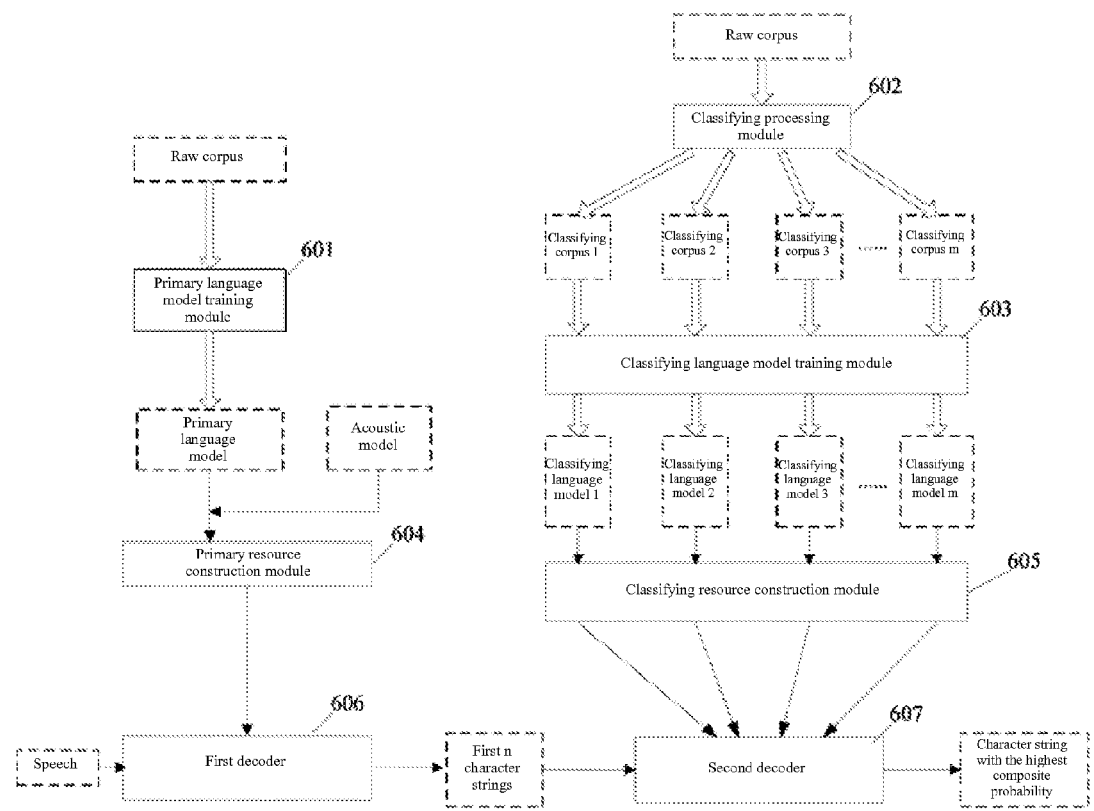
FIG. 6 is a composition schematic diagram of another speech recognition system mentioned in the present invention.

FIG. 6 is a composition schematic diagram of another speech recognition system mentioned in the present invention. Refer to FIG. 6, the system includes:

Primary language model training module 601, configured to carry out a calculation of the language model training according to the raw corpus to obtain the primary language model. Here, the language model training is the conventional regular language model training.

Classifying processing module 602, configured to carry out the corpus classification calculation for the raw corpus so as to obtain a different categories of more than one classifying corpus.

Classifying language model training module 603, configured to carry out a language model training calculation for the every mentioned classifying corpus to obtain more than one corresponding classifying language models.

Primary resource construction module 604, configured to construct primary decoding resource according to the acoustic model and the mentioned primary language model.

Classifying resource construction module 605, configured to construct the corresponding classifying decoding resource according to the various mentioned classifying language models.

First decoder 606, configured to decode the input speech according to the mentioned primary decoding resource, output n character strings of which probability value l (w) ranks the top n;

Second decoder 607, configured that according to the various classifying decoding resource corresponding to the various mentioned classifying language models in sequence, respectively decode the mentioned n character strings to obtain the probability value n(w) of every character string in every classifying language model; multiply the probability value n(w) of each character string in each classifying language model by the probability value l(w) of such character string in the primary language model to get composite probability p(w), output the character string with the highest composite probability p(w) as the recognition result of the mentioned input speech.

Figure 7:
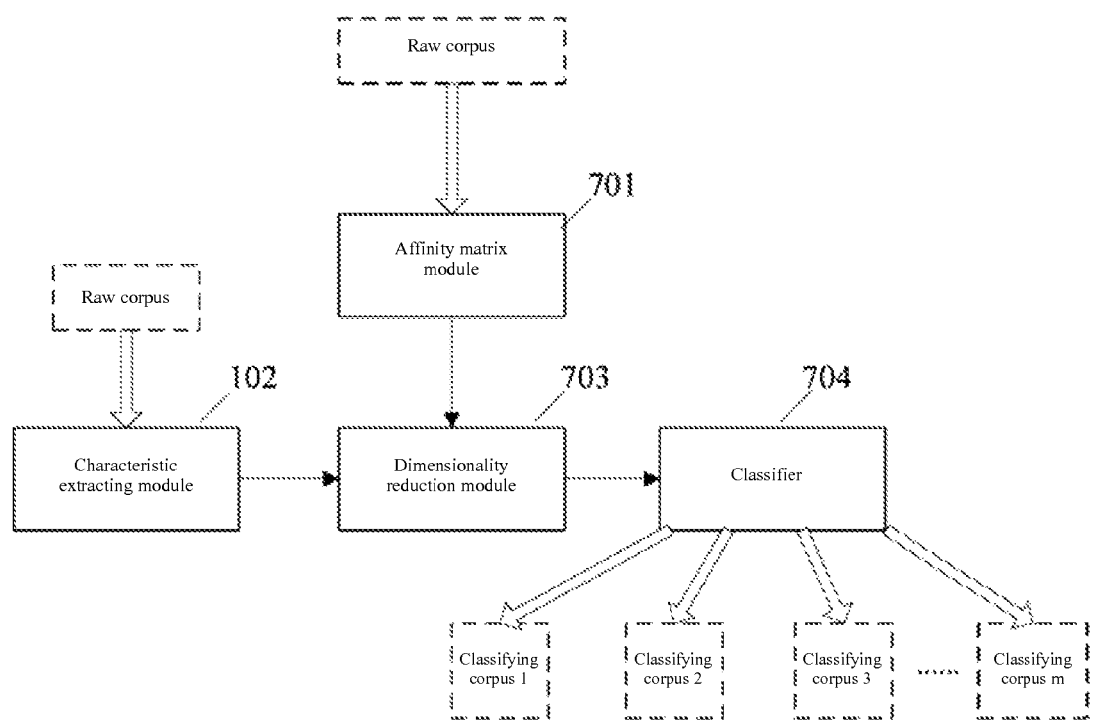
FIG. 7 is a composition schematic diagram of the classifying processing module mentioned in FIG. 5 and FIG. 6.

FIG. 7 is a composition schematic diagram of the classifying processing module mentioned in FIG. 5 and FIG. 6. Refer to FIG. 7, the mentioned classifying processing module specifically includes:

Affinity matrix module 701, configured to calculate the affinity matrix between terms according to the raw corpus. Please refer to the aforementioned Step 401 and Step 404 for the specific calculation method.

Characteristic extracting module 702, configured to use TF-IDF method to extract the term characteristic from the raw corpus.

Dimensionality reduction module 703, configured that according to the mentioned affinity matrix, use the dimensionality reduction method to process dimension reduction for the extracted term characteristic. In a preferred embodiment, the mentioned dimensionality reduction module is PCA dimensionality reduction module.

Classifier 704, configured to put the term characteristic after the processing of dimensionality reduction into the classifier for training, output different categories of more than one classifying corpus. In a preferred embodiment, the mentioned classifier is a SVM classifier.

The speech recognition method and system mentioned in the present invention is applicable in the technical field of speech recognition in the vertical field, recognition of speech keyword and Speech Q&A system, etc. Moreover, it can support multiple platforms, including the embedded platform and PC platform.

Figure 8:
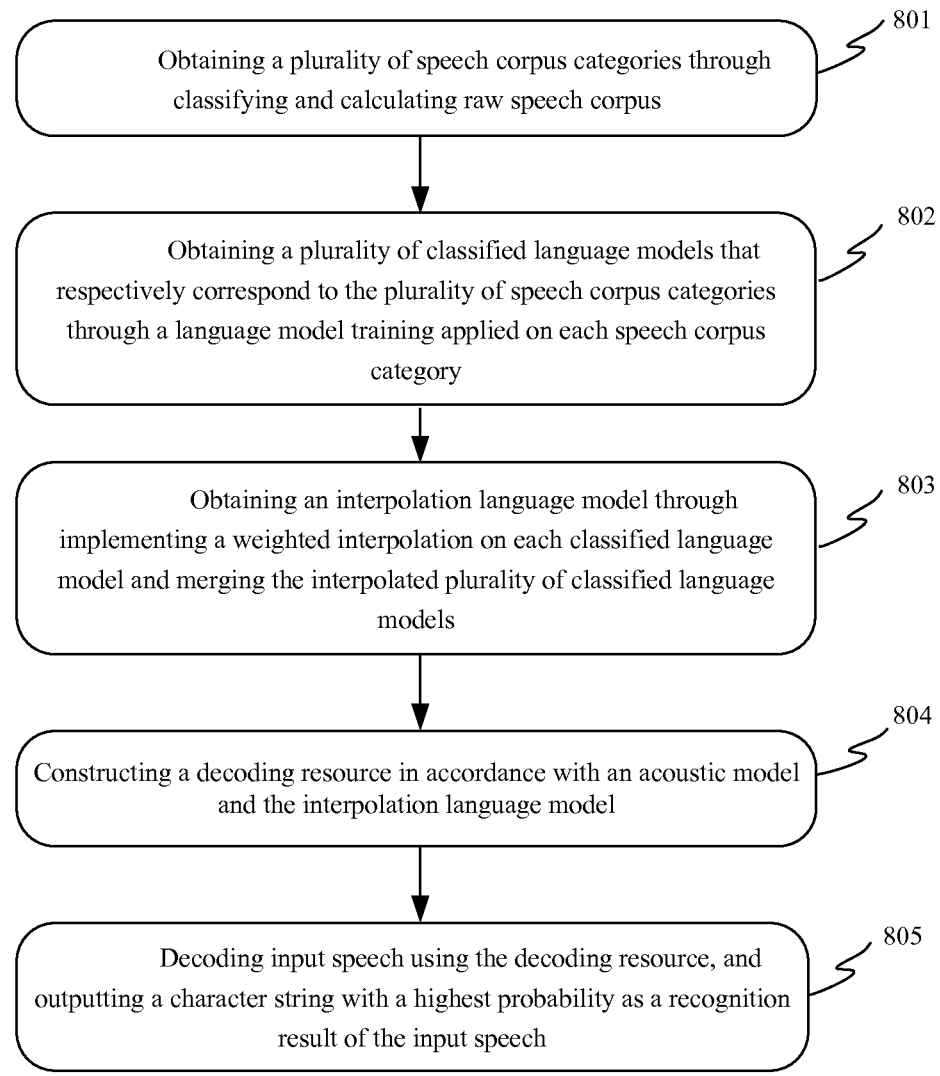
FIG. 8 is a flow chart of an automatic speech recognition method in accordance with some embodiments of the invention.

FIG. 8 is a flow chart of an automatic speech recognition method in accordance with some embodiments of the invention. The automatic speech recognition method comprises at a computer having one or more processors and memory for storing one or more programs to be executed by the processors: obtaining a plurality of speech corpus categories through classifying and calculating raw speech corpus 801; obtaining a plurality of classified language models that respectively correspond to the plurality of speech corpus categories through a language model training applied on each speech corpus category 802; obtaining an interpolation language model through implementing a weighted interpolation on each classified language model and merging the interpolated plurality of classified language models 803; constructing a decoding resource in accordance with an acoustic model and the interpolation language model 804; and decoding input speech using the decoding resource, and outputting a character string with a highest probability as a recognition result of the input speech 805.

Figure 9:
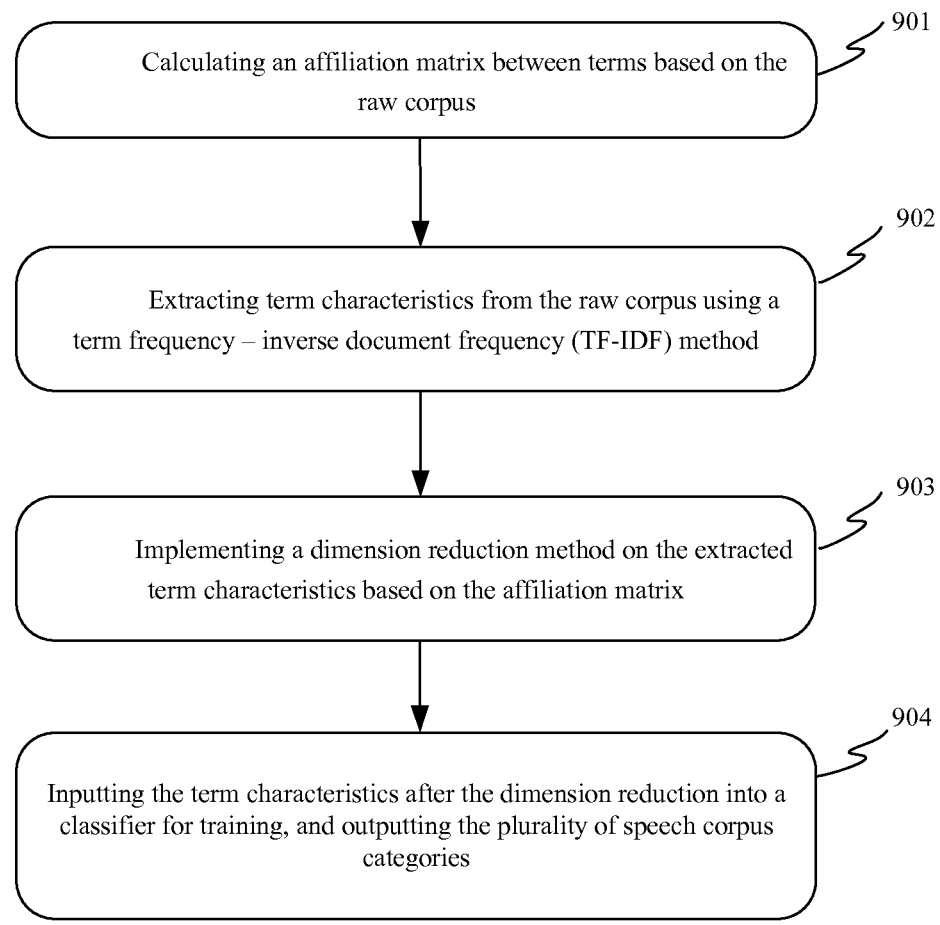
FIG. 9 is another flow chart of an automatic speech recognition method in accordance with some embodiments of the invention.

FIG. 9 is another flow chart of an automatic speech recognition method in accordance with some embodiments of the invention. The step of obtaining a plurality of speech corpus categories through classifying and calculating raw speech corpus further comprises calculating an affiliation matrix between terms based on the raw corpus 901; extracting term characteristics from the raw corpus using a term frequency—inverse document frequency (TF-IDF) method 902; implementing a dimension reduction method on the extracted term characteristics based on the affiliation matrix; inputting the term characteristics after the dimension reduction into a classifier for training 903; and outputting the plurality of speech corpus categories 904.

Figure 10:
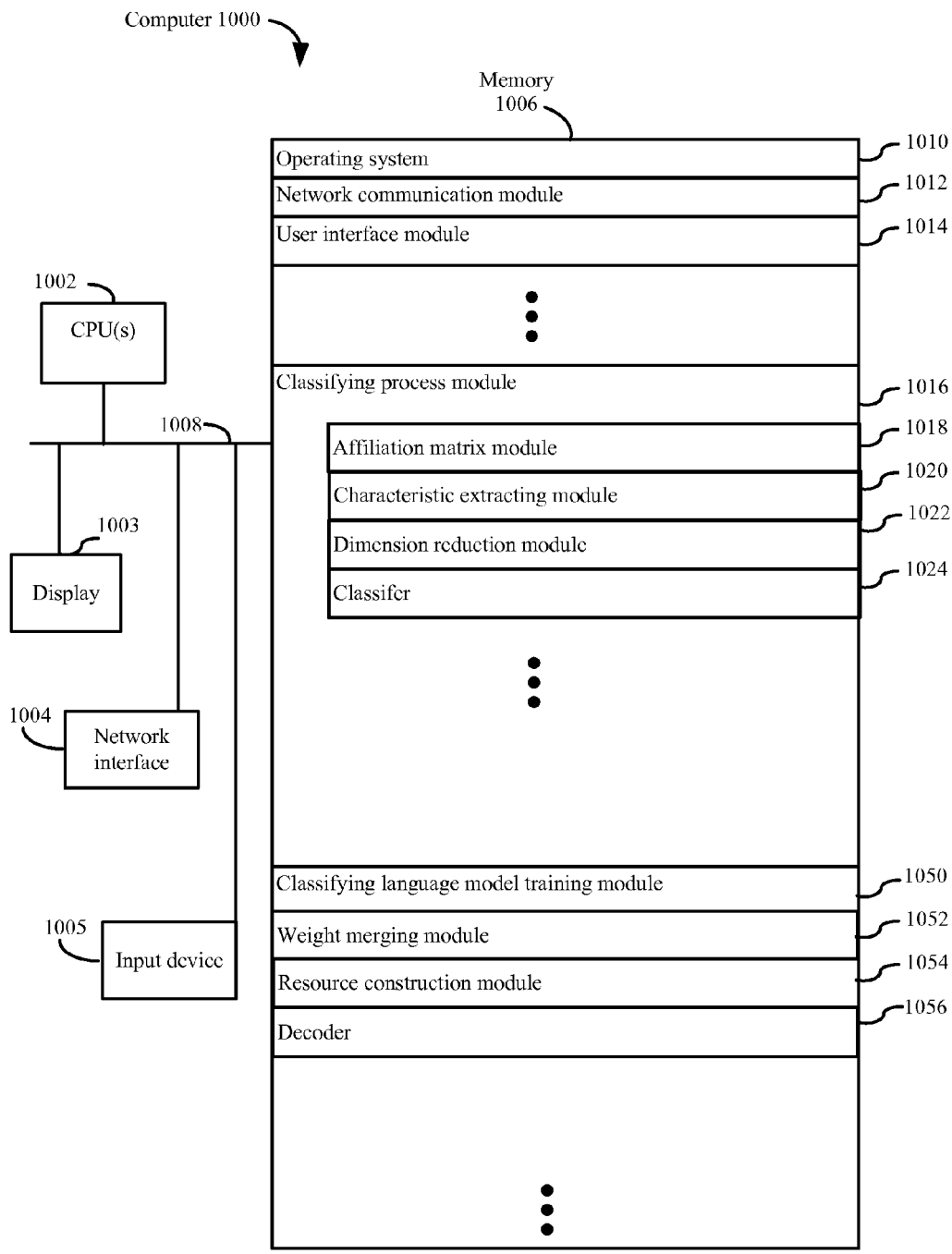
FIG. 10 is a computer diagram of an automatic speech recognition system method in accordance with some embodiments of the invention.

FIG. 10 is a computer diagram of an automatic speech recognition system method in accordance with some embodiments of the invention. The automatic speech recognition system comprises CPU(s) 1002, a display 1003, a network interface 1004, an input device 1005, a memory 1006, an operation system 1010, a network communication module 1012, a user interface module 1014, a classifying process module 1016 configured to obtain a plurality of speech corpus categories through classifying and calculating raw speech corpus; a classifying language model training module 1050 configure to obtain a plurality of classified language models that respectively correspond to the plurality of speech corpus categories through a language model training applied on each speech corpus category; a weight merging module 1052 configured to obtain an interpolation language model through implementing a weighted interpolation on each classified language model and merge the interpolated plurality of classified language models; a resource construction module 1054 configured to construct decoding resource in accordance with an acoustic model and the interpolation language model; and a decoder 1056 configured to decode input speech using the decoding resource, and outputting a character string with a highest probability as a recognition result of the input speech. The classifying process module 1016 further comprises a affiliation matrix module 1018 configured to calculate an affiliation matrix between terms based on the raw corpus; a characteristic extracting module 1020 configured to extract term characteristics from the raw corpus using a term frequency—inverse document frequency (TF-IDF) method; a dimension reduction module 1022 configured to implement a dimension reduction method on the extracted term characteristics based on the affiliation matrix; and a classifier 1024 configured to train the term characteristics after dimension reduction, and output the plurality of speech corpus categories.

Figure 11:
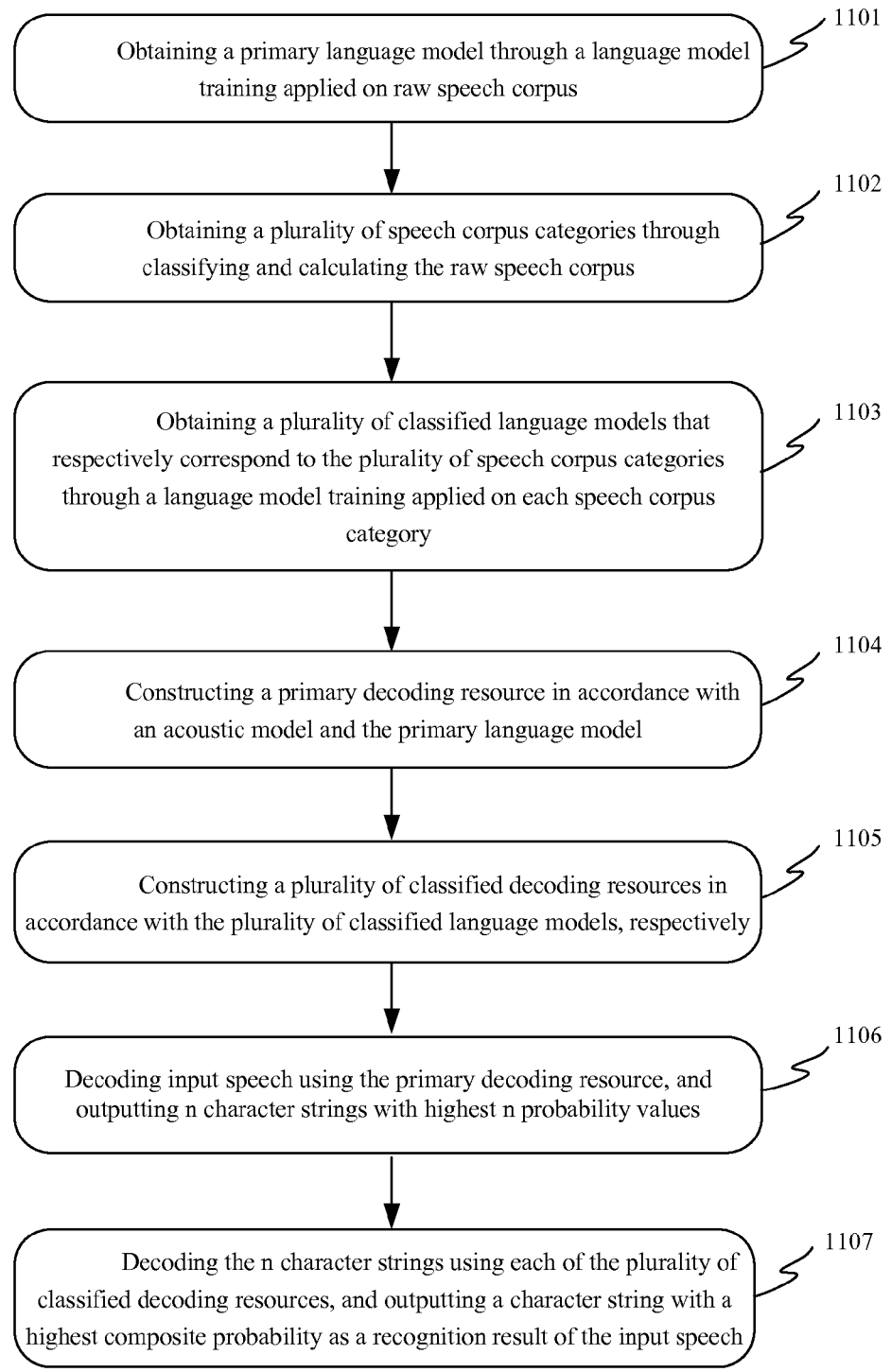
FIG. 11 is yet another flow chart of an automatic speech recognition method in accordance with some embodiments of the invention.

FIG. 11 is yet another flow chart of an automatic speech recognition method in accordance with some embodiments of the invention. The automatic speech recognition method comprises obtaining a primary language model through a language model training applied on raw speech corpus 1101; obtaining a plurality of speech corpus categories through classifying and calculating the raw speech corpus 1102; obtaining a plurality of classified language models that respectively correspond to the plurality of speech corpus categories through a language model training applied on each speech corpus category 1103; constructing a primary decoding resource in accordance with an acoustic model and the primary language model 1104; constructing a plurality of classified decoding resources in accordance with the plurality of classified language models, respectively 1105; and decoding input speech using the primary decoding resource, and outputting n character strings with highest n probability values 1106; and decoding the n character strings using each of the plurality of classified decoding resources, and outputting a character string with a highest composite probability as a recognition result of the input speech 1107.

Figure 12:
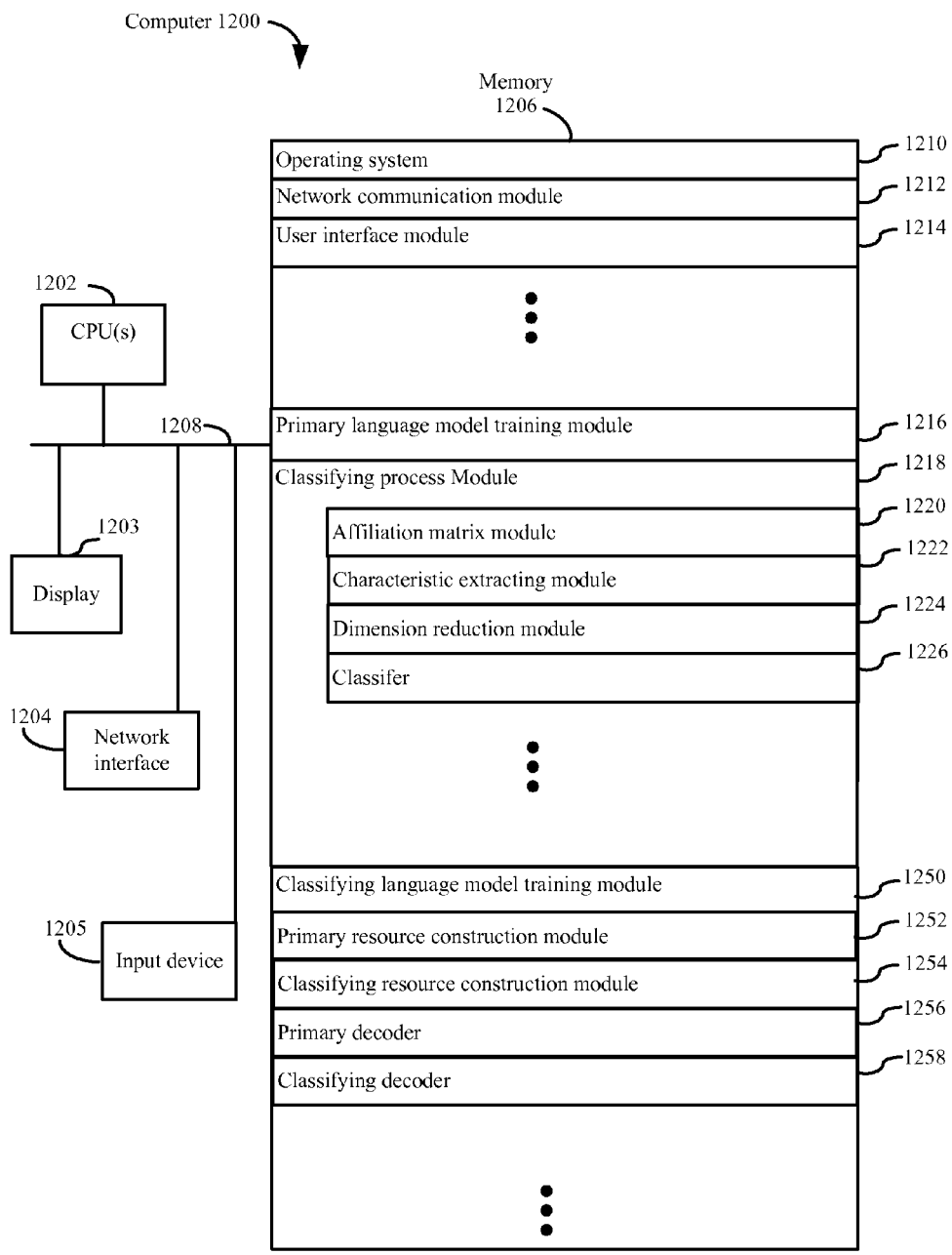
FIG. 12 is another computer diagram of an automatic speech recognition system method in accordance with some embodiments of the invention.

FIG. 12 is another computer diagram of an automatic speech recognition system method in accordance with some embodiments of the invention. The automatic speech recognition system comprises CPU(s) 1202, a display 1203, a network interface 1204, an input device 1205, a memory 1206, an operation system 1210, a network communication module 1212, a user interface module 1214, a primary language model training module 1216 configured to obtain a primary language model through a language model training applied on raw speech corpus; a classifying process module 1218 configured to obtain a plurality of speech corpus categories through classifying and calculating the raw speech corpus; a classifying language model training module 1250 configured to obtain a plurality of classified language models that correspond to the respective plurality of speech corpus categories through a language model training applied on each speech corpus category; a primary resource construction module 1252 configured to construct a primary decoding resource in accordance with an acoustic model and the primary language model; a classifying resource construction module 1254 configured to construct a plurality of classified decoding resources in accordance with the plurality of classified language models, respectively; and a primary decoder 1256 configured to decode input speech using the primary decoding resource, and outputting n character strings with highest n probability values; and a classified decoder 1258 configured to decode the n character strings using each of the plurality of classified decoding resources, and outputting a character string with a highest composite probability as a recognition result of the input speech. The classifying process module 1218 further comprises a affiliation matrix module 1220 configured to calculate an affiliation matrix between terms based on the raw corpus; a characteristic extracting module 1222 configured to extract term characteristics from the raw corpus using a term frequency—inverse document frequency (TF-IDF) method; a dimension reduction module 1224 configured to implement a dimension reduction method on the extracted term characteristics based on the affiliation matrix; and a classifier 1226 configured to train the term characteristics after dimension reduction, and output the plurality of speech corpus categories.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An automatic speech recognition method comprising:
   at a computer having one or more processors and memory for storing one or more programs to be executed by the processors:
   obtaining a plurality of speech corpus categories through classifying and calculating raw speech corpus;
   obtaining a plurality of classified language models that respectively correspond to the plurality of speech corpus categories through a language model training applied on each speech corpus category;
   obtaining an interpolation language model through implementing a weighted interpolation on each classified language model and merging the interpolated plurality of classified language models;

constructing a decoding resource in accordance with an acoustic model and the interpolation language model; and decoding input speech using the decoding resource, and outputting a character string with a highest probability as a recognition result of the input speech, wherein obtaining a plurality of speech corpus categories through classifying and calculating raw speech corpus further comprises:

calculating an affiliation matrix between terms based on the raw corpus;

extracting term characteristics from the raw corpus using a term frequency—inverse document frequency (TF-IDF) method;

implementing a dimension reduction method on the extracted term characteristics based on the affiliation matrix; and inputting the term characteristics after the dimension reduction into a classifier for training, and outputting the plurality of speech corpus categories;

wherein calculating an affiliation matrix between terms based on the raw corpus further comprises:

calculating co-occurrence rates between each term and any other term using equation $$CO_{ij} = \frac{f_{ij} \times f_{ij}}{d_{ij} \times d_{ij} \times f_i \times f_j},$$

and constructing a co-occurrence matrix based on the co-occurrence rates, wherein $f_{ij}$ is a number of times that term i occurs prior to term j, $d_{ij}$ is an average distance between term i and term j, $f_i$ is a term frequency of term i, and $f_j$ is a term frequency of term j; and calculating affiliation rates between each term and any other term using equation $A_{ij}$=sqrt($\Sigma$OR($CO_{ik}$, $CO_{jk}$) $\Sigma$OR$\Sigma$OR($CO_{ki}$, $CO_{kj}$)) based on the co-occurrence matrix, wherein OR is a logic OR operator and $CO_{ij}$ is a co-occurrence rate between term i and term j, and constructing the affiliation matrix based on the affiliation rates.

2. The method according to claim 1, wherein the dimension reduction method is a principal components analysis (PCA) dimension reduction method.

3. The method according to claim 1, wherein the classifier is a support vector machine (SVM) classifier.

4. The method according to claim 1, wherein the weighted interpolation process is implemented on each classified language model based on an obscure degree of the respective speech corpus category, wherein the obscure degree of the speech corpus category is in a positive correlation with a weighted value.

5. An automatic speech recognition system comprising:
one or more processors;
memory for storing one or more programs to be executed by the processors;
a classifying process module configured to obtain a plurality of speech corpus categories through classifying and calculating raw speech corpus;
a classifying language model training module configure to obtain a plurality of classified language models that respectively correspond to the plurality of speech corpus categories through a language model training applied on each speech corpus category;

a weight merging module configured to obtain an interpolation language model through implementing a weighted interpolation on each classified language model and merge the interpolated plurality of classified language models;

a resource construction module configured to construct decoding resource in accordance with an acoustic model and the interpolation language model; and a decoder configured to decode input speech using the decoding resource, and outputting a character string with a highest probability as a recognition result of the input speech, wherein the classifying process module further comprises:

an affiliation matrix module configured to calculate an affiliation matrix between terms based on the raw corpus;

a characteristic extracting module configured to extract term characteristics from the raw corpus using a term frequency—inverse document frequency (TF-IDF) method;

a dimension reduction module configured to implement a dimension reduction method on the extracted term characteristics based on the affiliation matrix; and a classifier configured to train the term characteristics after dimension reduction, and output the plurality of speech corpus categories;

wherein the affiliation matrix module is further configured to:

calculate co-occurrence rates between each term and any other term using equation $$CO_{ij} = \frac{f_{ij} \times f_{ij}}{d_{ij} \times d_{ij} \times f_i \times f_j},$$

and construct a co-occurrence matrix based on the co-occurrence rates, wherein $f_{ij}$ is a number of times that term i occurs prior to term j, $d_{ij}$ is an average distance between term i and term j, $f_i$ is a term frequency of term i, and $f_j$ is a term frequency of term j; and calculate affiliation rates between each term and any other term using equation $A_{ij}$=sqrt($\Sigma$OR($CO_{ik}$, $CO_{jk}$) $\Sigma$OR$\Sigma$OR($CO_{ki}$, $CO_{kj}$)) based on the co-occurrence matrix, wherein OR is a logic OR operator and $CO_{ij}$ is a co-occurrence rate between term i and term j, and construct the affiliation matrix based on the affiliation rates.

6. The system according to claim 5, wherein the dimension reduction module is a principal components analysis (PCA) dimension reduction module.

7. The system according to claim 5, wherein the classifier is a support vector machine (SVM) classifier.

8. The system according to claim 5, wherein the weighted interpolation is implemented on each classified language model based on an obscure degree of the respective speech corpus category, wherein the obscure degree of the speech corpus category is in a positive correlation with a weighted value.

* * * * *